(12) United States Patent
Lalouette

(10) Patent No.: US 6,606,221 B2
(45) Date of Patent: Aug. 12, 2003

(54) VISCOELASTIC DISC CLAMP USING ADHESIVE WITH RADIAL COMPLIANCE

(75) Inventor: Marc Jaques Lalouette, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 42 days.

(21) Appl. No.: 10/000,070

(22) Filed: Oct. 23, 2001

(65) Prior Publication Data

US 2002/0057530 A1 May 16, 2002

Related U.S. Application Data

(60) Provisional application No. 60/249,006, filed on Nov. 15, 2000.

(51) Int. Cl.⁷ .......................... G11B 23/03; G11B 17/02
(52) U.S. Cl. ...................................... 360/135; 360/99.12
(58) Field of Search ................ 360/99.05, 99.12, 360/98.08, 135

(56) References Cited

U.S. PATENT DOCUMENTS

| | | | |
|---|---|---|---|
| 4,920,441 A | * | 4/1990 | Kimura et al. ........... 360/99.08 |
| 4,945,432 A | | 7/1990 | Matsudaira et al. |
| 5,422,768 A | | 6/1995 | Roehling et al. |
| 5,459,627 A | * | 10/1995 | Peter ....................... 360/98.08 |
| 5,483,397 A | | 1/1996 | Gifford et al. |
| 5,538,774 A | | 7/1996 | Landin et al. |
| 5,590,004 A | | 12/1996 | Boutaghou |
| 5,663,851 A | | 9/1997 | Jeong et al. |
| 6,040,957 A | | 3/2000 | Konings |
| 6,064,547 A | | 5/2000 | Wittig et al. |

* cited by examiner

*Primary Examiner*—Robert S. Tupper
(74) *Attorney, Agent, or Firm*—Merchant & Gould, P.C.

(57) ABSTRACT

Herein is disclosed a method and apparatus for coupling a disc to a hub, so as to dampen radial vibrations of the disc. A hub rotates and is coupled to a magnetically encodable disc via a flexible joint. The flexible joint may be made out of a viscoelatic adhesive. There exists no rigid coupling between the disc and the hub, meaning that radial vibrations of the hub result in compression or decompression of the flexible joint, rather than in translation of the disc. The disc may be coupled to the hub by applying a viscoelastic adhesive to a hub, and applying a disc to the viscoelastic adhesive without otherwise rigidly coupling the disc to the hub.

22 Claims, 4 Drawing Sheets

VISCOELASTIC DISC CLAMP USING ADHESIVE WITH RADIAL COMPLIANCE

RELATED APPLICATIONS

This application claims the benefit of the filing date of U.S. Provisional Patent Application Serial No. 60/249,006 filed Nov. 15, 2000 and entitled "VISCOELASTIC DISK CLAMP USING ADHESIVE WITH RADIAL COMPLIANCE."

FIELD OF THE INVENTION

This application relates to hard disc drives and more particularly to an apparatus and method for coupling a disc to a hub, so as to dampen radial vibrations of the disc.

BACKGROUND OF THE INVENTION

The storage medium for a disc drive is a flat, circular disc capable of retaining localized magnetic fields. The data that are stored upon the disc find physical representation through these localized magnetic fields. The data are arranged on the disc in concentric, circular paths known as tracks.

The localized magnetic fields can be detected by a magnetically sensitive head when they are brought in close proximity to the head. During operation the disc continually rotates, meaning that for each rotation, a head fixed a given radius from the center of the disc would encounter every localized magnetic field along a given track. Altering the radial coordinate of the head allows the head to read or write data along a different track.

The head is mounted upon an actuator arm that is rotated by a servo control system. Accordingly, the track position of the head is controlled by the servo system. During a read or write operation, for example, the servo control system ensures that the head remains oriented over the proper track, a function known as "track following." The more accurately track following can be performed, the closer together the various tracks on the disc may be spaced, resulting in greater information density. Increased accuracy in track following also permits a higher rotational speed for the disc, resulting in faster access to information stored thereon.

One factor that renders track following less precise is the presence of radial vibrations. Radial vibrations cause the disc to move relative to the head, thereby moving the head away from the center of the particular track it is following. Radial vibrations may result from imperfections in the bearings interposed between the rotating and stationary members of the spin motor in the disc drive. These imperfections cause the rotating member (the hub) to vibrate radially as it rotates; in conventional disc drives, the disc is rigidly mounted to the hub, meaning that vibration of the hub results in vibration of the disc. Generally, the faster the disk rotates, the more pronounced the radial vibrations. Other sources of radial vibrations include windage effects that act upon the disc as it rotates and accident jarring of the disc drive itself.

If radial vibrations of the disc could be attenuated, track following could be performed with greater precision. Benefits, such as increased information density and increased rotational speed of the disc, may be realized by such attenuation. Accordingly, there is a need for an apparatus or method for reducing radial vibrations within disc drives.

SUMMARY OF THE INVENTION

Against this backdrop the present invention has been developed. The apparatus includes a hub that rotates, which is coupled to a magnetically encodable disc via a flexible joint. The flexible joint may be made of a viscoelastic adhesive. There exists no rigid coupling between the disc and the hub, meaning that radial vibrations of the hub result in compression or decompression of the flexible joint, rather than in translation of the disc.

Another embodiment of the present invention involves applying a viscoelastic adhesive to a hub, and applying a disc to the viscoelastic adhesive without otherwise rigidly coupling the disc to the hub.

These and various other features as well as advantages which characterize the present invention will be apparent from a reading of the following detailed description and a review of the associated drawings.

DETAILED DESCRIPTION

In traditional disc drives, one or more discs are rigidly coupled (either directly or via one or more intermediate rigid members) to the hub. The consequence of this rigid form of coupling is that radial vibration of the hub results in radial vibration of the disc—a result that is inimical to the goal of precise track following.

A disc may be protected from radial vibrations by flexibly coupling the disc to the hub. For example, a viscoelastic adhesive may be used to couple the disc to the hub. Under such a flexible coupling scheme, radial vibration of the hub results in radial compression or decompression of the viscoelastic adhesive, rather than in radial motion of the disc adhered thereto. To achieve this result, rigid coupling of the disc and hub should be entirely absent.

Figure 1:
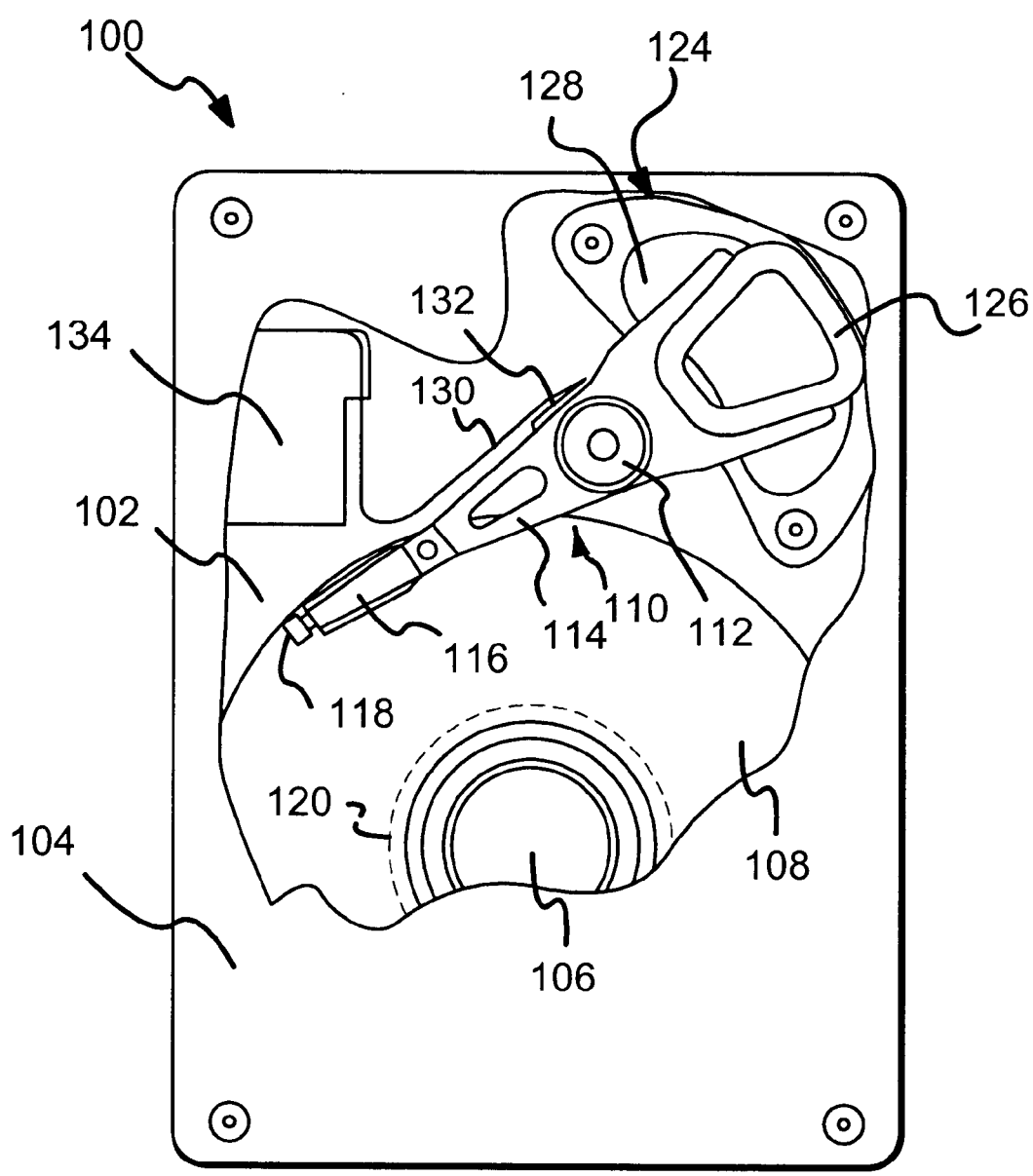
FIG. 1 is a plan view of a disc drive incorporating an embodiment of the present invention showing the primary internal components.

In the discussion that follows, the passages associated with FIG. 1 are intended generally to familiarize the reader with the operation of a disc drive and briefly introduce the invention. The passages associated with FIGS. 2–4 focus more particularly on flexible coupling of a disc and hub.

Figure 2:
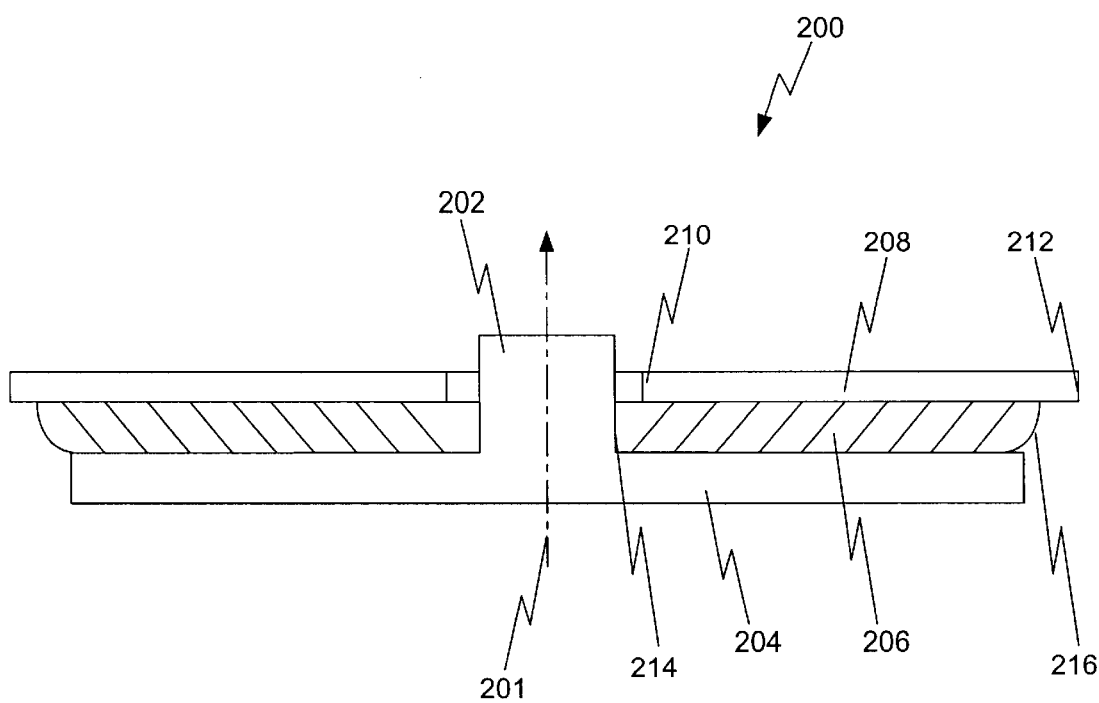
FIG. 2 depicts a cross-sectional view of an embodiment of a disc-and-hub assembly in accordance with the present invention.
Figure 3:
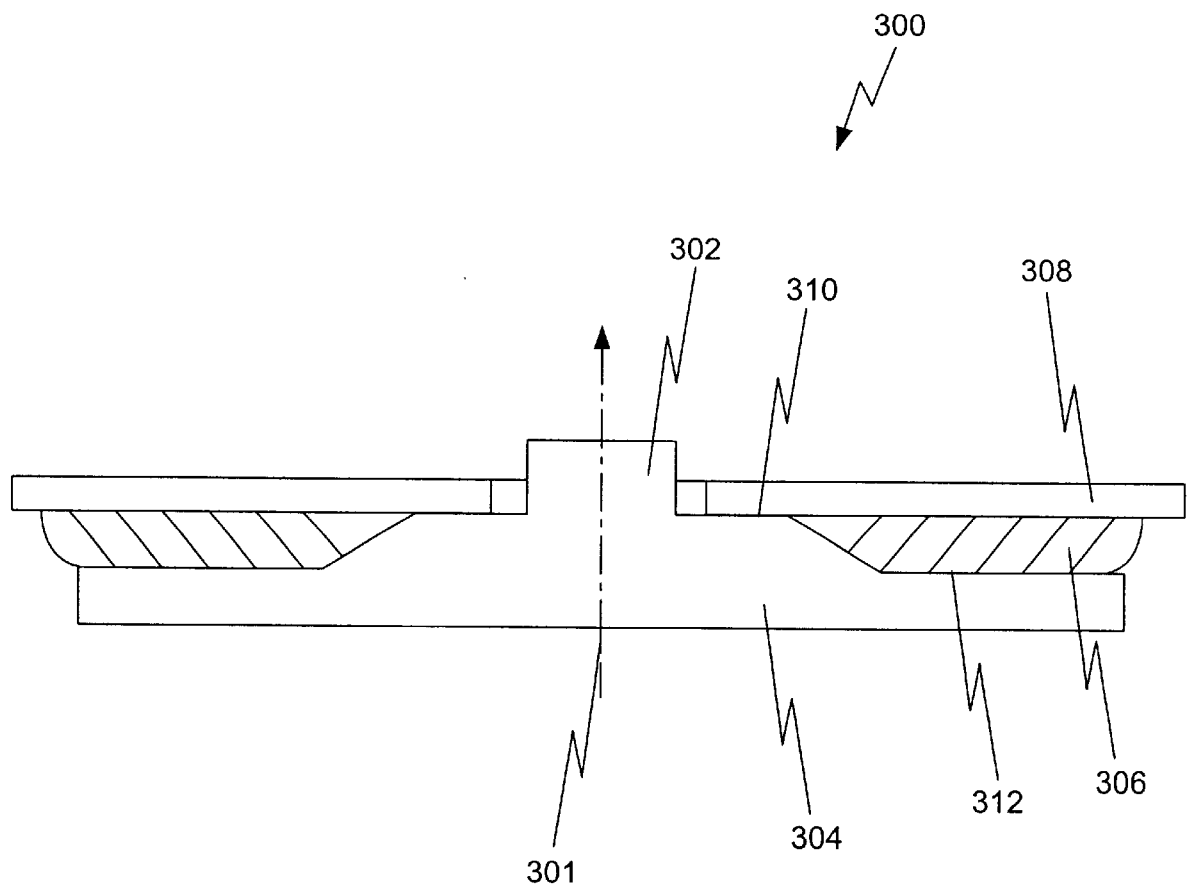
FIG. 3 depicts a cross-sectional view of another embodiment of a disc-and-hub assembly in accordance with the present invention.
Figure 4:
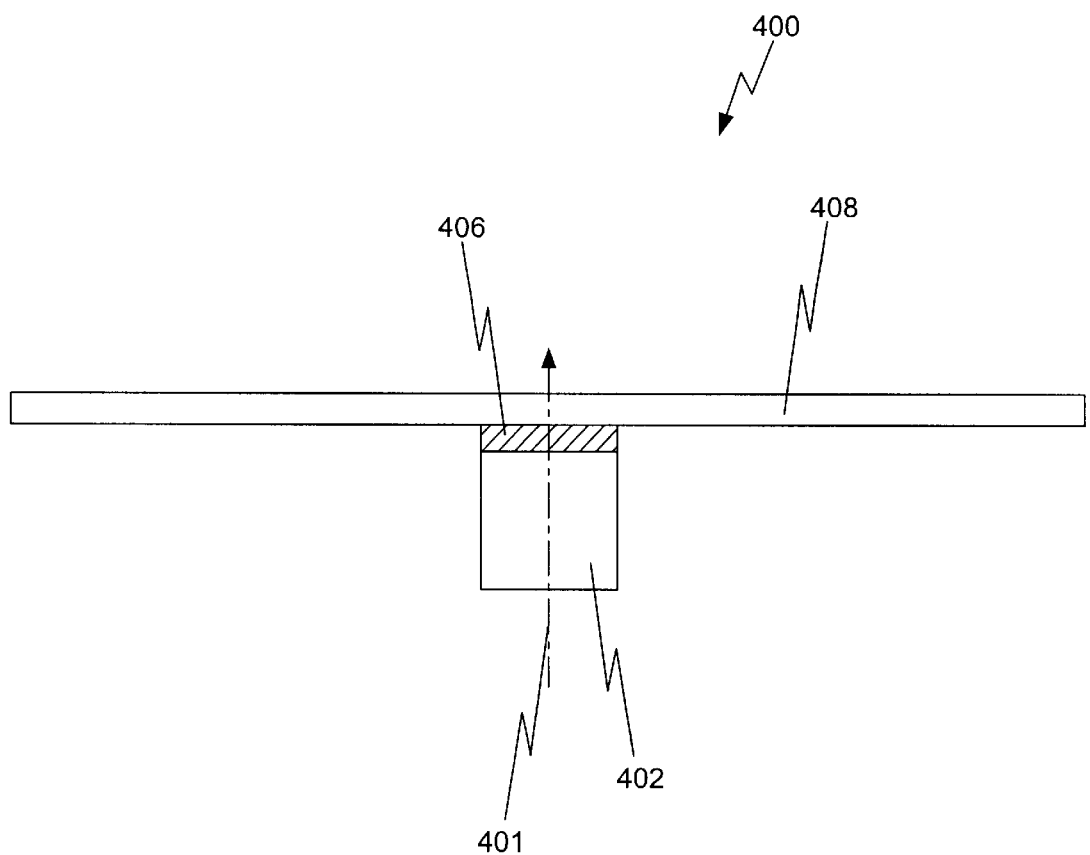
FIG. 4 depicts a cross-sectional view of yet another embodiment of a disc-and-hub assembly in accordance with the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor (also known as a hub) 106 which rotates one or more discs 108 at a constant high speed. The hub 106 and the one or more discs 108 are coupled flexibly, so as to dampen radial vibrations. FIGS. 2–4 depict various embodiments of flexible coupling of a disc 108 to a hub 106.

Information is written to and read from tracks on the discs 108 through the use of an actuator assembly 110, which rotates during a seek operation about a bearing shaft assembly 112 positioned adjacent the discs 108. The actuator assembly 110 includes one or more actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the one or more discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked. Some disk drives do not use park zones. In these disk drives, the heads are unloaded onto a ramp adjacent the disk and loaded from a ramp adjacent the disk.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

FIG. 2 depicts a cross-sectional view of an embodiment of a disc-and-hub assembly 200 in accordance with the present invention. The disc-and-hub assembly 200 is composed of a hub 202 that has a radially protruding hub flange 204, a flexible joint 206, and a magnetically encodable disc 208 that is coupled to the hub 202 via the flexible joint 206. There exists no rigid coupling, either direct or indirect, of the disc 208 and the hub 202. The disc-and-hub assembly 200 rotates about an axis 201 orthogonal to the disc 208. The disc 208 has an inner circumferential edge 210 and an outer circumferential edge 212. Likewise, the flexible joint 206 has an inner edge 214 and an outer edge 216.

As the disc-and-hub assembly 200 spins about its axis 201, the hub 202 vibrates radially. Radial vibrations result from imperfections in the bearings interposed between the hub 202 and stationary members of the motor in the disc drive. These imperfections cause the hub 202 to vibrate radially as it rotates. Generally, the faster the disc-and-hub assembly 200 rotates, the more pronounced the radial vibrations. In a disc drive that rotates at 60 Hertz (Hz), radial vibrations are pronounced in a frequency band of approximately 41–1800 Hz. In the disc-and-hub assembly of FIG. 2, radial vibration of the hub 202 causes the flange 204 to vibrate radially as well (because the hub 202 and flange 204 are a single, rigid structure). However, as the flange 204 vibrates radially, the flexible joint 206 compresses or decompress radially, rather than reacting to the vibration by translating, so that the disc 208 may remain untranslated by the radial vibration.

The flexible joint 206 may be composed of a viscoelastic adhesive. In one embodiment, the viscoelastic adhesive is formed as an adhesive sheet. One example of such a viscoelastic adhesive sheet is "Ultra-pure Viscoelastic Damping Polymer 242F02," available from 3M Corporation. If formed into a sheet, the viscoelastic adhesive material 206 may be flanked by a protective lining to keep the adhesive 206 clean prior to adhesion to the hub 202 or flange 204. The viscoelastic material may be applied to a surface of the hub 202 or hub flange 204 by peeling off one of the protective layers from the viscoelastic adhesive sheet, and then attaching one edge of the sheet to the hub 202 or flange 204; thereafter, the remainder of the sheet is gradually lowered (sometimes at an acute angle) on to the hub 202 or flange 204. To apply the disc 208 to the viscoelastic adhesive 206, the remaining protective layer is peeled off, and the disc 208 is placed upon the adhesive 206 with even pressure to ensure adhesion.

Although the disclosure has heretofore focussed upon radial vibrations, axial vibrations are also detrimental to track following. As the disc 208 bends (due to its rotation), axial vibrations result in radial displacment, just as radial vibrations result in radial displacement. As stated earlier, the consequence of radial displacement is unwanted relative motion between the disc 208 and the read/write head (not depicted in FIG. 2). The viscoelastic joint 206 also dampens axial vibrations by responding to them by compressing or decompressing axially, rather than translating the disc 208 in an axial direction.

Axial vibrations grow in intensity as they propagate toward the outer circumferential edge 212 of the disc 208. Thus, for the sake of damping axial vibrations where they are relatively intense, it is desirable to adhere the viscoelastic adhesive 206 to a surface that is toward the outer circumferential edge of the disc 208. In one embodiment, the outer edge 216 of the viscoelastic material 206 is flush with the outer circumferential edge 212 of the disc 208.

With regard to the geometry of the viscoelastic adhesive 206, one factor to be taken into account is the compliance of the viscoelastic adhesive 206. The compliance of a viscoelastic adhesive 206 is proportional to its height. Accordingly, for the sake of compliant coupling of the disk 208 to the hub 202, it is desirable for the viscoelastic adhesive 206 to be relatively tall. In one embodiment, the viscoelastic adhesive 206 may be at least 0.001 inches in height (as measured between flange 204 surface and disk 208 surface). In other embodiments, the viscoelastic adhesive 206 may be at least 0.005 inches in height.

Another factor influencing the geometry of the viscoelastic adhesive 206 is its capacity to dissipate energy. Smaller volumes of viscoelastic adhesive 206 dissipate greater amounts of energy. Thus, to maximally damp vibrations (be they radial or axial), the viscoelastic adhesive 206 should be relatively tall (so as to be compliant) and relatively thin (so as to have a small volume, permitting it to dissipate the energy transmitted by radial and axial vibrations). On the other hand, since the contact area between the viscoelastic adhesive 206 and the disc 208 is responsible for coupling the disc 208 to the hub 202, there must be a sufficient contact area to prevent the disc 208 from literally falling off of the hub 202 during rotation. To balance these considerations, some embodiments may have the inner edge 214 of the viscoelastic adhesive 206 as close as 2 millimeters to the outer edge 216 of the viscoelastic adhesive 206. In other embodiments, the volume of the viscoelastic material 206 may be between 0.5% and 5% of that of the disc 208. In still other embodiments, between 5% and 100% of the surface area of the disc 208 may be adhered to the viscoelastic adhesive 206.

FIG. 3 depicts a cross-sectional view of another embodiment of a disc-and-hub assembly 300 in accordance with the present invention. The disc-and-hub assembly 300 is composed of a hub 302 that has a radially protruding hub flange 304, a flexible joint 306, and a magnetically encodable disc 308 that is coupled to the hub 302 via the flexible joint 306. There exists no rigid coupling, either direct or indirect, of the disc 308 and the hub 302. The disc-and-hub assembly 300 rotates about an axis 301 orthogonal to the disc 308.

Once again, the flexible joint 306 may be composed of a viscoelastic adhesive. Thus, the physical properties regarding compliance and energy dissipation, which were discussed with reference to FIG. 2, apply equally to the viscoelastic material 306 depicted in FIG. 3. Thus, there are various embodiments of the disc-and-hub assembly 300 depicted in FIG. 3 in which the viscoelastic material 306 takes on the geometric characteristics described in the passages relating to FIG. 2.

In the disc-and-hub assembly 300 of FIG. 3, the hub flange 304 is composed of an upper plane 310 and a lower plane 312. The disc 308 rests atop the upper plane 310 and also rests atop a layer of viscoelastic material 306 filling at least a portion of the gap between the lower plane 312 and the disc 308. The upper plane 310 is used to achieve precise z-axis registration of the disc 308. Although the disc rests atop the upper plane 310, there exists no rigid coupling between the disc 308 and the upper plane 310. Stated another way, the disc 308 may move relative to the upper plane 310, effectively limited only by its joinder with the viscoelastic material 306. The difference in height between the upper plane 310 and the lower plane 312 defines the height of the viscoelastic material 306. In one embodiment, the difference in height between the two planes 310, 312 is at least approximately 0.0005 inches. In another embodiment, the difference is at least approximately 0.005 inches.

FIG. 4 depicts a cross-sectional view of yet another embodiment of a disc-and-hub assembly 400 in accordance with the present invention. The disc-and-hub assembly 400 is composed of a hub 402, a flexible joint 406, and a magnetically encodable disc 408 that is coupled to the hub 402 via the flexible joint 406. There exists no rigid coupling, either direct or indirect, of the disc 408 and the hub 402. The disc-and-hub assembly 400 rotates about an axis 401 orthogonal to the disc 408.

Once again, the flexible joint 406 may be composed of a viscoelastic adhesive. Thus, the physical properties regarding compliance and energy dissipation, which were discussed with reference to FIG. 2, apply equally to the viscoelastic material 406 depicted in FIG. 4. Therefore, there are various embodiments of the disc-and-hub assembly 400 depicted in FIG. 4 in which the viscoelastic material 406 takes on the geometric characteristics described in the passages relating to FIG. 2.

In the disc-and-hub assembly 400 of FIG. 4, the disc 408 is adhered to a top surface of the hub 402, thus eliminating the need for a hub flange. Such an arrangement permits the disc-and-hub assembly 400 to achieve a low profile, thereby permitting the disc drive in which the assembly 400 is used to also have a low profile.

To summarize preferred embodiments of the present invention, an apparatus for for coupling a disc to a hub, so as to dampen radial vibrations of the disc consists of the following. A hub (such as 202) that rotates is coupled to a magnetically encodable disc (such as 208) via a viscoelastic joint (such as 206). There exists no rigid coupling between the disc (such as 208) and the hub (such as 202). The hub (such as 202) may be shaped to possess a flange (such as 204), in which case the viscoelastic adhesive (such as 206) is disposed upon the flange (such as 204), and the disc (such as 208) is disposed upon the viscoelastic adhesive (such as 206). Optionally, the flange (such as 304) may be composed of an upper plane (such as 310) and a lower plane (such as 312), in which case the disc rests upon the upper plane (such as 310), and a viscoelastic adhesive layer (such as 306) is disposed upon the lower plane (such as 312), thereby adhering the disc (such as 308) to the lower plane (such as 312). Optionally, the upper plane (such as 310) and the lower plane (such as 312) may be separated by at least 0.0005 inches, resulting in a viscoaelastic layer (such as 306) at least 0.0005 inches in height. In another embodiment, the upper plane (such as 310) and the lower plane (such as 312) may be separated by at least 0.005 inches. In yet another ambodiment, between 5% and 100% of the surface area of the disc (such as 208) is adhered to the viscoelastic layer (such as 206). In yet another embodiment, the viscoelastic adhesive layer (such as 206) has a volume of between 0.5% and 5% of that of the disc (such as 208). The viscoelastic adhesive layer (such as 206) is characterized by an inner edge (such as 214) and an outer edge (such as 216), and the disc (such as 208) is characterized by an outer circumferential edge (such as 212) and an inner circumferential edge (such as 210). In one embodiment, the outer edge (such as 216) of the viscoelastic adhesive layer is flush with the outer circumfrential edge of the disc (such as 212). In another embodiment, the inner edge (such as 214) of the viscoelastic adhesive layer is within 2 millimeters of the outer circumferential edge of the disc (such as 212).

The disc (such as 208) may be adhered to the hub (such as 202) by applying a viscoelastic adhesive (such as 206) to the hub (such as 202 or 204), and applying the disc (such as 208) to the viscoelastic adhesive (such as 206) without otherwise rigidly coupling the disc (such as 208) to the hub (such as 202 or 204). Optionally, the viscoelastic adhesive (such as 206) may be a viscoelastic adhesive tape. In that case, to attach the tape (such as 206) to the hub, a first protective layer is peeled from the viscoelastic adhesive tape (such as 206). Next, a first edge of the viscoelastic adhesive tape (such as 206) is attached to the hub (such as 202 or 204). Then, the remainder of the viscoelastic adhesive tape (such as 206) is lowered at an acute angle on to the hub (such as 202 or 204). Finally, pressure is applied to the tape (such as 206). To attach the disc (such as 208) to the viscoelastic adhesive tape (such as 206), first a protective layer is peeled from the viscoelastic adhesive tape (such as 206). Next, the disc (such as 208) is placed upon the viscoelastic adhesive tape (such as 206). Finally, pressure is applied to the disc (such as 208), so as to adhere the disc (such as 208) to the viscoelastic adhesive tape (such as 206).

According to another embodiment of the inventoin, a disc-and-hub assembly that dampens radial vibrations is composed of a hub (such as 202) that rotates, thereby rotating a magnetically encodable disc, and a means (such as 206) for flexibly coupling the disc (such as 208) to the hub (such as 202) without rigidly coupling the disc (such as 208) and the hub (such as 202). The means (such as 206) for flexibly coupling the disc to the hub may be disposed atop the hub (such as 202), and the disc (such as 208) may disposed atop the means (such as 206) for flexibly coupling the disc (such as 208) to the hub (such as 202).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the hub flange may be of another shape or may consist of more than two planes. Additionally, the flexible joint may consist of another suitable material other than a viscoelastic material. Numerous other changes may be made which will readily suggest themselves to those skilled in the art and which are encompassed in the spirit of the invention disclosed and as defined in the appended claims.

What is claimed is:

1. A disc drive with a disc-and-hub assembly that dampens radial vibrations, the disc-and-hub assembly comprising:
   a hub that rotates;
   a viscoelastic joint that bonds a magnetically encodable disc to the hub, thereby causing the disc to rotate with the hub; and
   an absence of rigid coupling between the disc and the hub.

2. The disc drive of claim 1, wherein:
   the hub possesses a flange;
   a viscoelastic adhesive layer is disposed upon and bonded to the flange; and
   the disc is disposed upon and bonded to the viscoelastic adhesive.

3. The disc drive of claim 2, wherein:
   the flange possesses a surface comprised of an upper plane and a lower plane;
   the disc rests upon the upper plane; and
   the viscoelastic adhesive layer is disposed upon the lower plane, so that the disc is adhered to the lower plane by the viscoelastic adhesive.

4. The disc drive of claim 3, wherein the upper plane and the lower plane are separated by at least 0.0005 inches.

5. The disc drive of claim 4, wherein the upper plane and the lower plane are separated by at least 0.005 inches.

6. The disc drive of claim 2, wherein the viscoelastic adhesive layer is at least 0.001 inches in height.

7. The disc drive of claim 2, wherein between 5% and 100% of the surface area of the disc is adhered to the viscoelastic layer.

8. The disc of claim 2, wherein:
   the viscoelastic adhesive layer possesses an inner edge and an outer edge;
   the disc possesses an outer circumferential edge and an inner circumferential edge; and
   the outer edge of the viscoelastic adhesive layer is coextensive with an outer circumferential edge of the flange.

9. The disc drive of claim 2, wherein:
   the viscoelastic adhesive layer is characterized by an inner edge and an outer edge;
   the disc is characterized by an outer circumferential edge and an inner circumferential edge; and
   the inner edge of the viscoelastic adhesive layer is within 2 millimeters of the outer edge of the viscoelastic adhesive layer.

10. The disc drive of claim 2, wherein the viscoelastic adhesive layer has a volume of between 0.5% and 5% of that of the disc.

11. The disc drive of claim 1, wherein the viscoelastic joint has a volume of between 0.5% and 5% of that of the disc.

12. A method of coupling a disc to a hub, so as to dampen radial vibration of the disc, the method comprising:
   adhering a viscoelastic adhesive to the hub; and
   adhering the disc to the viscoelastic adhesive without otherwise rigidly coupling the disc to the hub.

13. The method of claim 12, wherein the viscoelastic adhesive comprises a viscoelastic adhesive tape, and wherein adhering the viscoelastic adhesive tape to the hub comprises:
   peeling off a first protective layer from one side of the viscoelastic adhesive tape;
   attaching a first edge of the one side of the viscoelastic adhesive tape to the hub;
   applying the viscoelastic adhesive tape, at an acute angle, to the hub; and
   applying pressure to the tape to fasten the adhesive tape to the hub.

14. The method of claim 12, wherein applying the viscoelastic adhesive to the hub comprises applying the viscoelastic adhesive to the hub throughout a surface area that is between 5% and 100% of the surface of the disc.

15. The method of claim 12, wherein applying the viscoelastic adhesive to the hub comprises applying the viscoelastic adhesive to a hub flange protruding from the hub.

16. The method of claim 12, wherein applying the viscoelastic adhesive to the hub comprises applying a volume of viscoelastic adhesive to the hub that is between 0.5% and 5% of the volume of the disc.

17. The method of claim 12, wherein the viscoelastic adhesive comprises a viscoelastic adhesive tape, and wherein adhering the disc to the viscoelastic adhesive tape comprises:
   peeling off a protective layer from the viscoelastic adhesive tape;
   placing the disc upon the viscoelastic adhesive tape; and
   applying pressure to the disc, so as to adhere the disc to the viscoelastic adhesive tape.

18. A disc drive with a disc-and-hub assembly that dampens radial vibrations, the disc-and-hub assembly comprising:
   a hub that rotates, thereby rotating a magnetically encodable disc; and
   a means for flexibly coupling the disc to the hub without rigidly coupling the disc and the hub.

19. The disc drive of claim 18, wherein the means for flexibly coupling the disc to the hub comprises a viscoelastic adhesive.

20. The disc drive of claim 19, wherein the viscoelastic adhesive has a surface area of between 5% and 100% of the surface area of the disc.

21. The disc drive of claim 19, wherein the viscoelastic adhesive has a volume of between 0.5% and 5% of that of the disc.

22. The disc drive of claim 18, wherein:
   the means for flexibly coupling the disc to the hub is disposed atop the hub; and
   the disc is disposed atop the means for flexibly coupling the disc to the hub.

* * * * *

UNITED STATES PATENT AND TRADEMARK OFFICE
CERTIFICATE OF CORRECTION

PATENT NO.    : 6,606,221 B2
DATED         : August 12, 2003
INVENTOR(S)   : Laloutte It is certified that error appears in the above-identified patent and that said Letters Patent is hereby corrected as shown below:

<u>Title page,</u>
Item [75], Inventor, replace "Jaques" with -- Jacques --.

Signed and Sealed this

Thirtieth Day of December, 2003

JAMES E. ROGAN
*Director of the United States Patent and Trademark Office*